Dec. 10, 1963 C. F. DIETRICH 3,113,485
OPTICAL PROJECTION PANTOMETERS
Filed June 21, 1961
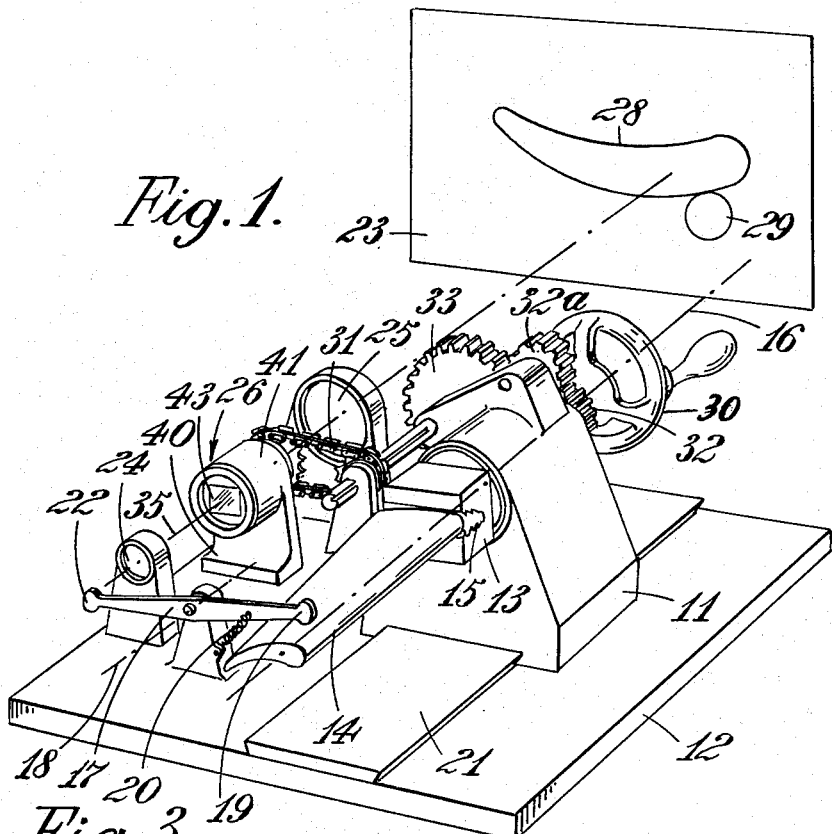
Fig.1.
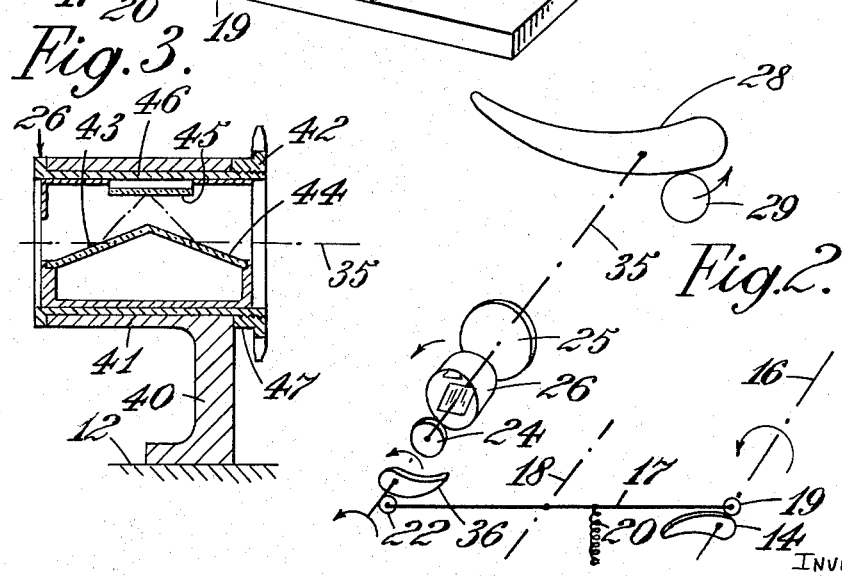
Fig.3.
Fig.2.
INVENTOR
Cornelius F. Dietrich
Watson, Cole, Grindle & Watson
ATTORNEYS

United States Patent Office 3,113,485
Patented Dec. 10, 1963

3,113,485
OPTICAL PROJECTION PANTOMETERS
Cornelius Frank Dietrich, Maidenhead,
Berkshire, England
Filed June 21, 1961, Ser. No. 118,660
6 Claims. (Cl. 88—24)

This invention comprises improvements in or relating to optical projection pantometers.

This application is a continuation in part of my application Serial No. 718,650, filed March 3, 1958, and entitled "Optical Projection Pantometers," now abandoned.

Optical projection pantometers are instruments for testing the shape of workpieces in which an image is projected on to a screen showing, to an enlarged scale, deviations of shape of the workpiece under test from the ideal. Usually there is an index and on the screen appears an enlarged outline of the ideal shape, the image of the index of the outline moving in relation to one another so that all the successive features of the outline are successively brought into relation to the index. The index occupies a position which agrees with the actual corresponding feature of the workpiece under examination at a given time and therefore the index is either spaced from the outline or overlaps it if the workpiece is not perfectly true, and deviations are easily noted.

In some pantometers as heretofore constructed the mechanism included a compound mounting for the index to enable it to execute a movement in two dimensions and for its image to move around the outline of the ideal shape on the screen, the said outline being fixed. It is one main purpose of this invention to provide for the image of the index to move around the representation on the screen without requiring any such compound mounting.

According to the present invention, in an optical projection pantometer there is provided the combination of a rotatable workpiece holder, a feeler yieldingly urged in a direction to bring it into contact with a workpiece held therein, an index, means to constrain the index to move in unison with and proportionately to the feeler movement, and a projection system comprising a screen bearing when in use a representation of the desired shape of the workpiece, a projection lens, and collimation lens coaxial therewith, these lenses being located between the index and the screen so that their optical axis is coincident with the point on the representation which corresponds with the axis of rotation of the workpiece-holder, and a rotatable inverting mirror-assembly located between the two lenses and rotating at half the speed of the workpiece about the said optical axis for the purpose hereinafter described.

The following is a description by way of example of one construction in accordance with the invention:

Referring to the accompanying drawings,

FIGURE 1 is a diagrammatic perspective view of apparatus in accordance with the present invention;

FIGURE 2 is an optical diagram to illustrate the method of operation; and

FIGURE 3 is a longitudinal section through the inverting mirror-assembly.

Referring to FIGURE 1, a workpiece-holder is provided consisting of a standard 11 on a base 12 and in the standard is mounted a rotatable holder 13 for holding a workpiece 14 shown as a turbine blade, which is gripped in the holder by its root 15, with the length of the blade parallel to the rotational axis of the holder 13 and its centre of gravity approximately coincident with the axis which is indicated by the chain line 16.

A lever 17 is provided, pivoted on an axis 18 parallel with the axis of rotation 16 of the workpiece-holder 13, and having on one end a feeler 19 in the form of a circular bulge which is capable of bearing on the workpiece. The lever is biased by a spring 20 to make the feeler 19 bear on the surface of the workpiece 14. The standard 11 which carries the workpiece-holder 13 is mounted on a guide 21 so that it may be shifted longitudinally to make any desired part along the length of the workpiece 14 face the feeler 19. At the other end the lever 17 carries an index 22 which is shaped as a disc of the same diameter as the feeler, the lever being of equal length on both sides of its pivot, and the centres of disc 22 and feeler 19 being exactly in line with the pivotal axis 18 of the lever.

At some distance from the index disc and at right angles to the axis of the lever is a screen 23. Between the screen 23 and the disc 22 is an optical system comprising a projection lens 24 and a collimator 25 on a common axis 35 at right angles to the screen. A suitable illuminating lantern and condenser (not shown) are provided. The projection lens 24 is set at a distance from the disc 22 equal to its focal length. Consequently it collimates the rays from the disc. The lens 25 is set at its own focal length from the screen, and collects the collimated rays from the projection lens and brings them to a focus on the screen. In the intervening space between projector and collimator is a reversing mirror-assembly 26 mounted for rotation about the optical axis 35 of the lenses 24, 25. On the screen is a representation 28 of the ideal shape of the workpiece to the same scale of enlargement as that of the image 29 of the disc 22 cast by the optical system on the screen. A hand-wheel 30 for rotating the workpiece-holder 13 is geared to the mounting of the mirror-assembly by chain 31 and gears 32, 32a and 33 in the ratio of 1:2 and so that the direction of rotation is the same as that of the turbine blade.

The optical axis 35 of the projection system, with the rotatable mirror-assembly 26, extends through a point on the screen representation which corresponds to the axis 16 of rotation of the workpiece 14, and at the index end it misses the index disc by an amount sufficient to make it coincide with the corresponding axis of an imaginary rotatable workpiece touching the index in the same relation thereto as the actual workpiece touches the feeler.

In FIGURE 2 the same parts are shown but purely diagrammatically and an imaginary rotatable workpiece is shown at 36. If this workpiece were rotated in the direction shown at the same speed as the workpiece 14 and if it were of the same shape as the workpiece 14, the disc 22 would touch it at all points of its rotation and the image of the rotating workpiece 36 would be cast upon the screen in relation to the disc 22 and would remain at rest because the rotating mirror-assembly 26 would cancel the rotation of the image. The image of the rotating imaginary workpiece 36 would therefore coincide on the screen with the outline 28 of the representation of the ideal shape of the workpiece. The image of 36 on the screen and of the disc 22 would therefore be seen in relation to one another and the disc 22 would be seen as moving around the fixed representation of the workpiece.

It follows that it is unnecessary to have an actual workpiece in place of the rotating workpiece 36. All that is necessary is to have the fixed representation 28 on the screen and the image 29 of the disc 22 will be seen moving around the representation of the ideal workpiece 28.

Any discrepancy between the ideal shape and the shape of the actual workpiece 14 will appear as a gap or an overlap between the image 29 of the disc and the representation 28 of the ideal shape of workpiece. It will be seen in this way that a complete two-dimensional movement is obtained on the screen 23 by mere rotational movements of the parts which carry the workpiece and the inverting mirror-assembly 26.

The construction of the inverting mirror-assembly 26 is shown in FIGURE 3. The assembly is mounted in a standard 40 which has a tubular bearing member 41 concentric with the optical axis. The assembly comprises a tubular case 46 having a flange 47 at one end and a gap at the other. On the flange 47 there is secured the driving sprocket 42 on which the chain 31 works, and within the tube 46 there are two inclined mirrors 43, 44 and a mirror 45 which extends parallel to the axis of the tube 46. The mirror 43 is set at such an angle that it reflects parallel rays received by the tube upwards at 45 degrees on to the mirror 45 and this reflects them down again at 45 degrees on to the mirror 44 which is set at such an angle that it sends the beam forward again in a direction parallel to its original direction but with the image reversed.

I claim:

1. In an optical projection pantometer the combination of a rotatable workpiece-holder rotatable through a whole revolution, a feeler yieldingly urged in a direction to bring it into contact with a workpiece held therein, an index, means to constrain the index to move in unison with and proportionately to the feeler movement, and a projection system comprising a screen bearing when in use a representation of the desired shape of the workpiece, a projection lens, and collimation lens coaxial therewith, these lenses being located between the index and the screen so that their optical axis is fixed and is coincident with the point on the representation which corresponds with the axis of rotation of the workpiece-holder, and a rotatable inverting mirror-assembly located between the two lenses and gearing between the workpiece-holder and mirror-assembly to rotate the latter at half the speed of the workpiece about the said optical axis in the same direction to that in which the workpiece rotates.

2. An optical projection pantometer as claimed in claim 1, wherein the feeler and index are mounted on opposite ends of a lever pivoted between the axis of the optical system and the axis of rotation of the workpiece.

3. An optical projection pantometer as claimed in claim 2, wherein the feeler and the index are disc-shaped in contour and a line joining their centres passes through the pivotal axis of the lever.

4. An optical projection pantometer as claimed in claim 3, wherein the lever has arms of equal length and the feeler and index have equal radii.

5. In an optical projection pantometer the combination of a completely rotatable workpiece-holder, a feeler and means to urge the feeler yieldingly into contact with a workpiece held in the holder, an index, means to constrain the index to move in unison with and proportionately to the feeler movement, and a projection system comprising a screen bearing when in use a representation of the desired shape of the workpiece, a fixed projection lens located between the index and screen, a rotatable inverting mirror assembly between the projection lens and screen, and means operatively connecting the mirror assembly and workpiece together to rotate the mirror assembly in the same direction as the rotation of the workpiece but at half the speed.

6. An optical projection pantometer comprising the combination set forth in claim 5, wherein the means to constrain the index to move in unison with the feeler consists of a lever on which the feeler is mounted at one end and the index at the other, the index being located in such relation to the projection axis of the lens and mirror assembly that the image of the index, when the workpiece is of the correct shape, will impinge tangentially on the representation of the workpiece on the screen.

References Cited in the file of this patent

UNITED STATES PATENTS

| | | |
|---|---|---|
| 2,454,959 | Barnes | Nov. 30, 1948 |
| 2,682,710 | Crosby | July 6, 1954 |
| 2,883,905 | Crook et al. | Apr. 20, 1959 |

FOREIGN PATENTS

| | | |
|---|---|---|
| 624,854 | Great Britain | June 17, 1949 |